United States Patent [19]

Karass

[11] 4,004,770
[45] Jan. 25, 1977

[54] HOOK AND HOOK ASSEMBLY USING A SLING OF BAND MATERIAL

[76] Inventor: Thomas J. Karass, 411 Kindersley Ave., Mount Royal, Quebec, Canada

[22] Filed: Nov. 26, 1974

[21] Appl. No.: 527,297

Related U.S. Application Data

[63] Continuation-in-part of Ser. No. 353,567, April 23, 1973.

[52] U.S. Cl. .............................. 248/323; 248/215; 248/307; 248/340
[51] Int. Cl.² ...................................... F16M 13/00
[58] Field of Search .......... 248/307, 323, 339, 340, 248/341, 214, 215

[56] References Cited

UNITED STATES PATENTS

| 1,313,807 | 8/1919 | Frazier | 248/339 |
| 3,007,666 | 11/1961 | Hamel | 248/217 |
| 3,139,260 | 6/1964 | Hamel | 248/340 |
| 3,143,329 | 8/1964 | Christopher | 248/317 |
| 3,288,414 | 11/1966 | Fortunato | 248/307 X |
| 3,297,290 | 1/1967 | Patterson | 248/307 X |

FOREIGN PATENTS OR APPLICATIONS

| 1,180,102 | 10/1964 | Germany | 248/307 |
| 225,611 | 9/1910 | Germany | 248/307 |
| 129,682 | 10/1950 | Sweden | 248/307 |
| 852,516 | 10/1960 | United Kingdom | 248/307 |

*Primary Examiner*—William H. Schultz

[57] ABSTRACT

A hook and a hook assembly adapted in particular to suspend a meat carcass using a sling made of band material. The hook includes a body having a suspending portion and a hooking portion defining a J configuration, a horizontally extending flat portion to flatly receive the sling, a protruding lip portion extending from the suspending portion and defining a lower straight edge overlying the flat portion and disposed below the tip of the hooking portion and defining a spacing between the suspending and hooking portions which is smaller than the width of the band material to prevent the sling from jumping off from the hook.

6 Claims, 20 Drawing Figures

U.S. Patent  Jan. 25, 1977  Sheet 1 of 4  4,004,770
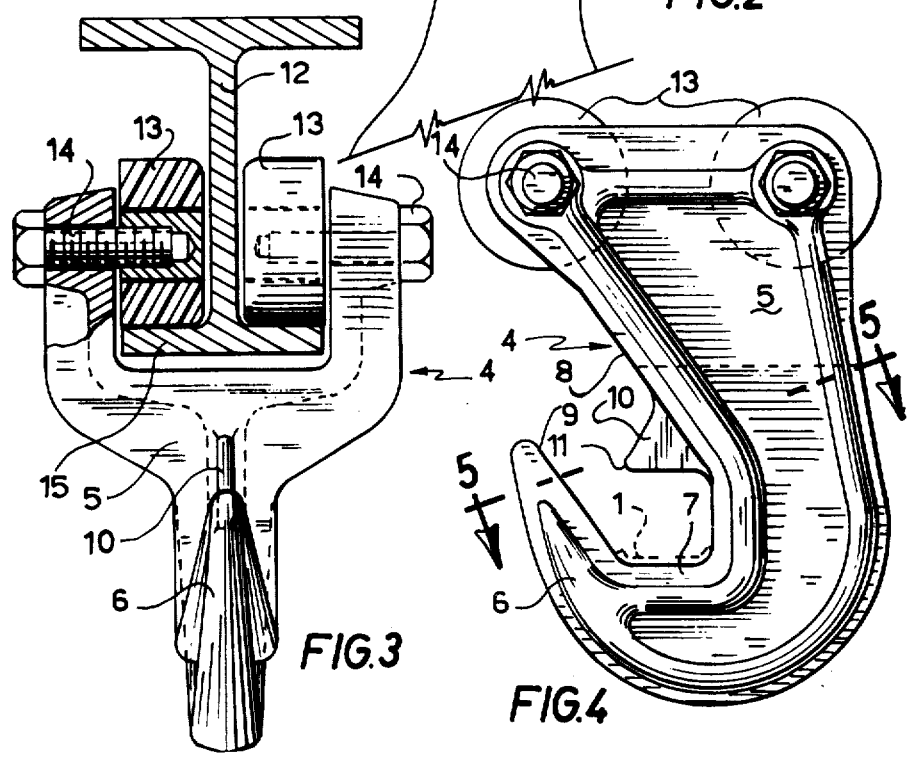

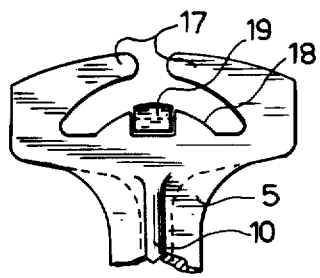
FIG.12
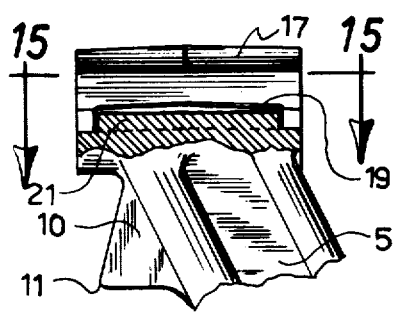
FIG.13
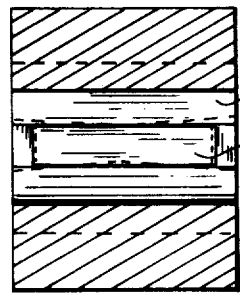
FIG.15
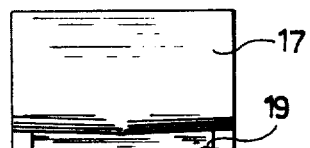
FIG.14
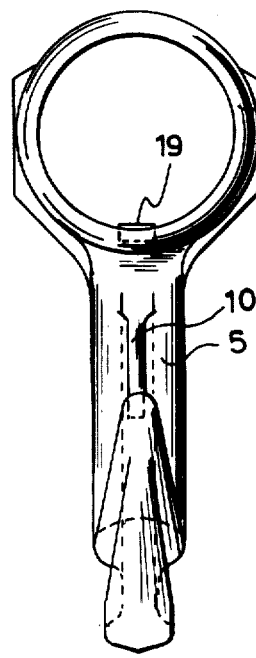
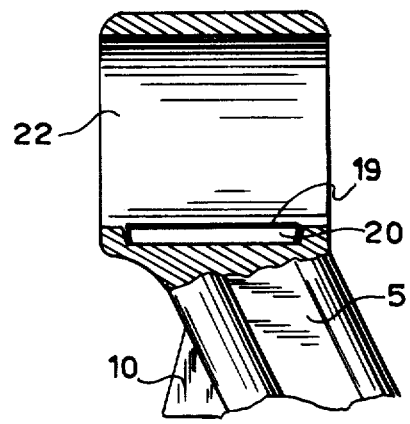
FIG.17

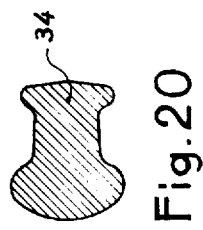
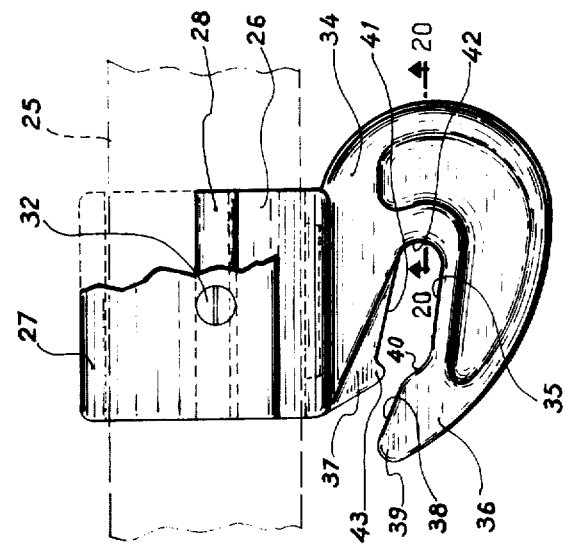
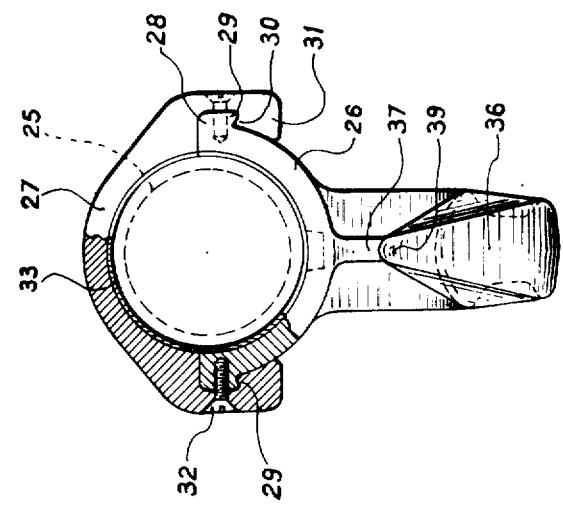

HOOK AND HOOK ASSEMBLY USING A SLING OF BAND MATERIAL

The present application is a Continuation-in-Part of U.S. patent application Ser. No. 353,567, filed Apr. 23, 1973, entitled: "HOOK AND HOOK ASSEMBLY USING A SLING OF BAND MATERIAL", in the name of Thomas J. Karass.

This invention relates to hooks and, more particularly, to a hook and a hook assembly of the type to hangingly support meat carcasses in railway cars and trucks.

The hooks of the above type which existed and have been used so far have been of S shape. Such S-shape hooks are not found satisfactory to transport meat carcasses, since the latter are then allowed to fall off therefrom during transportation. This falling off is due in part to the shape of the hook which allows balancing of the suspended carcass and, in part, to the conventional manner of directly suspending the carcass by the hook, because all the dynamic upward motion of the carcass is transferred to the portion of the hook inserted in the carcass and to the portion of the suspending rail which engages the hook.

The Applicant has conceived a new hook of the above type and a hook assembly which are particularly adapted to prevent the falling off of meat carcasses during transportation in railway cars and trucks. More particularly, the Applicant has noted that the manner of hooking and the form of the hook can be improved by indirectly suspending the meat carcasses by a sling of band material which engages a hook particularly adapted to support such sling and prevent accidental jumping of the latter.

More particularly, the applicant has noted that suspending the meat carcass by a flexible sling of band material provides an effective means for absorbing all dynamic upward motion of the meat carcass during the transportation. The center of gravity of the carcass is located on the vertical line projecting from the hook sitting position on a support rail, thus avoiding the off balance position as occurred in the conventional S-shaped hook. Hooks in accordance with the invention are therefore designed with a J shape; with a good sitting position for the flexible sling; with rounded edges to avoid sling cutting; and with no sharp protruding end, because it is no longer necessary, due to the indirect suspension of the meat carcass by a sling of band material.

Applicant's hooks also provide means to positively prevent the accidental jumping of the sling off the hook.

It is therefore a general object of the invention to provide a hook assembly and a hook of the above type particularly adapted to prevent the falling off of meat carcasses during the transportation thereof.

It is a more specific object of the invention to provide a hook assembly using a sling of band material to suspend a meat carcass and a hook particularly constructed to support the sling of band material and prevent accidental jumping off therefrom.

It is a still further object of the invention to provide a hook of the above type which is adapted to be displaced along a supporting rail and transversely restrained relative to the latter and which includes a horizontally extending flat portion to support a sling of band material, mutually facing inner edges which upwardly extend from the opposite ends respectively of the flat portion, and a protuberant lip portion having a lower edge overlying and substantially parallel with the flat portion, and lying below the level of the tip of the hook, and forming a spacing between these edges which is smaller than the width of the band material, whereby to restrain the sling against jumping off from the hook.

The above and other objects and advantages of the invention will be better understood by reference to the following detailed description of preferred embodiments of the invention which are illustrated, by way of examples only, in the accompanying drawings, wherein:

FIG. 1 is a side elevation view of a sling of the band type as used with a hook according to the present invention;

FIG. 2 is a side elevation view of a hook assembly according to the invention using a sling of band material in operative engagement with a meat carcass;

FIG. 3 is an end view of the hook as seen from the left in FIG. 2;

FIG. 4 is a side view of the hook of FIGS. 2 and 3;

Figure 5:
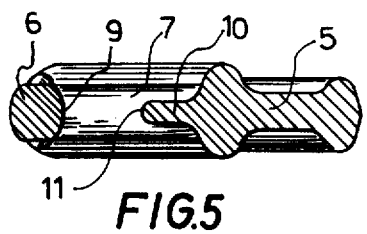
FIG. 5 is a cross-sectional view as seen along line 5—5 in FIG. 4.
Figure 8:
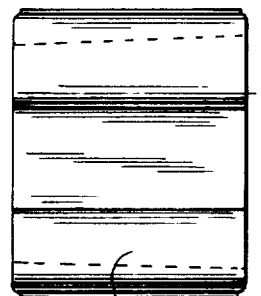
Figure 6:
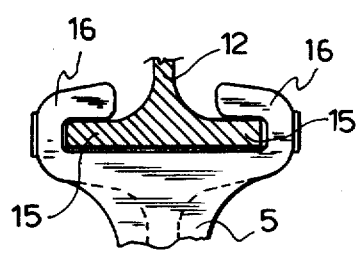
Figure 7:
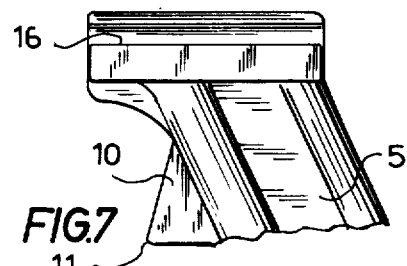
Figure 9:
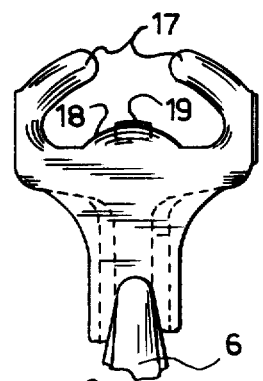
Figure 10:
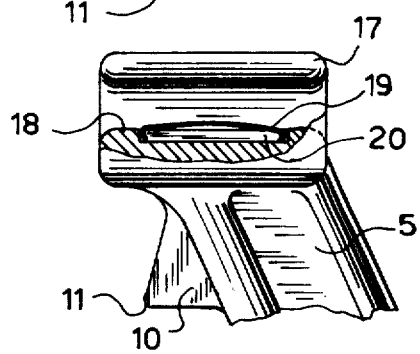
Figure 11:
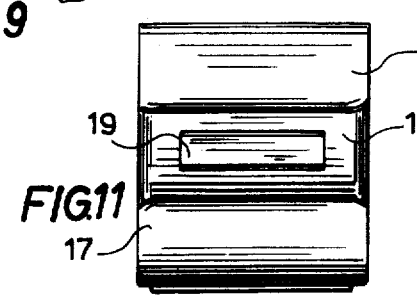

FIGS. 6, 7, and 8 are partial end, side and top views respectively of the upper portion of a hook according to a second embodiment of the invention;

FIGS. 9, 10, and 11 are partial end, side and top views respectively of the upper portion of a hook according to a third embodiment of the invention;

FIGS. 12, 13, and 14 are partial end, side and top views respectively of the upper portion of a hook according to a fourth embodiment of the invention;

FIG. 15 is a cross-sectional view as seen along line 15—15 in FIG. 13;

FIG. 16 is an end view of a hook according to a fifth embodiment of the invention;

FIG. 17 is a partial side view of the hook of FIG. 16;

FIG. 18 is a side elevation, partially cut away, of still another embodiment of the hook of the invention;

FIG. 19 is a front end elevation, partially in cross-section; and

FIG. 20 is a section taken along line 20—20 of FIG. 18.

The sling 1, illustrated in FIGS. 1 and 2, forms part of the hook assembly to be used with anyone of the hooks of the present invention. The sling 1 is made of band material, such as defined in one or the other of the two Canadian Pat. Nos. 818,310 and 889,808, granted to the present Applicant.

As best shown in FIG. 1, the sling 1 is attached by a knot around the hamstring 2 of a meat carcass.

A hook 4 according to a first embodiment of the invention, as well as the hooks of the other embodiments, includes a body having a suspending portion 5, an intermediate flat portion 7 and a hooking portion 6. The flat portion 7 is horizontally disposed and interconnects portions 5 and 6. As shown in FIG. 4, the length of the flat portion 7 of the hook is at least equal to the width of the band of material forming the sling 1. Preferably, the above length should be about the same as the width of the band material, such that the sling 1 flatly rests thereon without undue transverse sliding or displacement.

The suspending portion 5 and the hooking portion 6 have mutually facing edges 8 and 9 respectively which are spaced apart from each other and are similarly upwardly inclined relative to the flat portion 7, at opposite ends of the latter. A protuberant lip portion 10 projects away from the edge 8 of suspending portion 5 towards the edge 9 to form a spacing between the tip 11 of the lip and the edge 9 which is smaller than the width of the band material forming the sling 1. Furthermore, the lower edge of the protuberant lip portion 10 is straight, parallel to and overlies the flat portion 7, but is disposed below the level of the uppermost point of hooking portion 6, such that during transportation, if the sling 1 jumps in the air, it is prevented from falling off the hooking portion 6 due to the afore-mentioned spacing and overlying relationship defined by the lip 10. To be inserted into the afore-mentioned spacing, the sling must be transversely twisted, what is unlikely to accidentally occur.

Preferably, as shown, the suspending portion, the hooking portion 6 and the lip portion 10 are integrally formed into a single body.

The upper or free end of the suspending portion 5 is provided with a rail engaging device which, in the first embodiment of FIGS. 2 to 5, is adapted to rollably engage a rail 12 having a I-shape cross-section. The rail engaging device of the first embodiment includes four wheels 13 held to the suspending portion 5, each by a bolt 14, such that these wheels 13 rollably engage the opposite flanges 15 of the I-shape rail 12.

In the second embodiment, illustrated in FIGS. 6, 7, and 8, the rail engaging device is formed by mutually facing bent flanges 16 integral with the suspending portion 5 and arranged to slidably engage the opposite flanges 15 of the I-shape rail 12.

In the third embodiment, illustrated in FIGS. 9, 10, and 11, the rail engaging device is formed by curved flanges 17 and face 18 adapted to engage similarly curved opposite flanges of an I-shape rail, not shown. A spring blade 19 is housed into a cavity 20 into the curved face 18 and outwardly bulges therefrom to frictionally bias and hold the hook along the rail.

In the fourth embodiment, illustrated in FIGS. 12 to 15 inclusive, the rail engaging device is as in the third embodiment, except for the spring blade 19 which, instead, engages over a raised portion 21 of suspending portion 5.

In the fifth embodiment illustrated in FIGS. 16 and 17, the rail engaging device is defined by a sleeve portion 22 integrally formed with the suspending portion 5 and arranged to slidably engage around a tubular or cylindrical rail. A spring blade 19 is also provided into a cavity 20, as in the third embodiment, to axially and radially retain the hook relative to the rail.

FIGS. 18 to 20 show still another embodiment of the invention. As shown, the hook is for sliding along a hook consisting of a tubular rail, shown at 25, and the track-engaging means includes a cylindrical sleeve portion made of two parts: namely a bottom part 26 and a top part 27 which are removably interengageable to form a complete cylinder.

Part 26, of semi-cylindrical shape, is provided at its top longitudinal edges with an external rib 28 with a dovetailed lower face 29 adapted to lock with the similar dovetailed shoulder 30 formed on the inside face of the longitudinal edge portions 31 of the top semi-cylindrical sleeve portion 27. The inter-engagement of the sleeve parts 26, 27 is along the entire length of the sleeve portion and, therefore, is very strong and will resist a great weight suspended from the hook. For additional safety, locking screws 32 engage the part 27 with part 26 at the level of ribs 28. It is a simple matter to separate the two sleeve parts by removing the screws 32 and sliding the top part 27 relative to the bottom part along the axis of the sleeve and, thus, the hook can be inserted on and removed from the tubular rail 25 at any location along said rail.

To facilitate sliding of the hook along the rail 25, the inside surfaces of the sleeve parts 26, 27 are lined with a lining 33 of frictionless material, such as the synthetic resin known under the registered trade mark "TEFLON", owned by Du Pont of Canada Limited.

The hook proper comprises the suspending portion 34, the intermediate flat portion 35 and the hook portion 36, as in the other embodiments, together with the protuberant lip portion 37, which depends from suspending portion 34. The flat portion 35 is at least as long as the width of the band of material forming the sling 1, which is adapted to overlie the same to be suspended from the hook. Said flat portion 35 makes a small angle with respect to the horizontal, as it was found that a beef side hung from the sling 1, due to its offset center of gravity, will slightly incline the sling and the inclination of flat portion 25 is such that the sling will normally lie flat across the same when a beef side is suspended from the sling.

The hooking portion 36 has an inner edge part 33 which starts from the uppermost point 19 or tip of the hooking portion 36 and which is straight and slightly more inclined to the horizontal than the flat portion 35. Said edge part 33 is extended by a slightly concave inner edge portion 40 which smoothly merges with both edge parts 33 and flat portion 35.

The protuberant lip portion 37 defines a straight lower edge 41 merging with the concave inner edge 42 of the suspending portion 34 and slightly diverging from flat portion 35 in the direction of tip 39.

Lower edge 41 forms at its outer end a boss 43 which downwardly protrudes from edge 41 and terminates at a point which is lower than the uppermost point or tip 39 of hooking portion 36.

This embodiment of the hook is preferred because it can be fitted to a tubular rail 25 anywhere along the length thereof without having to be slid from one end of said rail. Moreover, it is easier to insert into and remove from the hook a sling 1 attached to a beef side or the like due to the smaller difference in height between the tip of the hooking portion and the flat portion receiving the sling and also due to the smaller inclination to the horizontal of the inner edge 38 of the hooking portion 36 with respect to the corresponding edge in the other embodiment. Yet the hook of this last embodiment positively prevents accidental disengagement of the sling from the hook during transport of a load suspended from the hook by means of the sling, because the sling necessarily abuts recess 40 or boss 43, or edge 38 during upward movement of the sling from flat portion 35 combined with lateral movement towards the hook tip 39.

The hook is preferably made of a non-corrosive alloy or metal for safe use in the corrosive conditions encountered in refrigerated railway cars and trucks.

It must be noted that all the afore-described rail engaging devices prevent transverse balancing of the meat carcasses and thereby minimize the possibilities of hurting one another and falling off the hooks.

What I claim:

1. A hook for suspending a sling of band material therefrom comprising a suspending portion, an intermediate generally flat portion and a hooking portion joined together into a generally J-shaped configuration, said flat portion being as long as the width of said band material and interconnecting said suspending portion and said hooking portion, a protuberant lip portion attached to said suspending portion, positioned between said suspending portion and said hooking portion and forming a reduced spacing between the same which is smaller than the width of said band material, said protuberant lip portion having a lower edge which overlies said flat portion and which forms a downwardly extending boss at its outer end, said boss having a portion which is lower than the uppermost point of said hooking portion and a sleeve portion integrally formed with said suspending portion and arranged to slidably engage around a tubular rail.

2. A hook as claimed in claim 1, wherein said lower edge has a straight portion which slightly diverges with respect to said flat portion in the direction of said hooking portion.

3. A hook as claimed in claim 1, made of a non-corrodable material and including a lining of frictionless material adhering to the inside surface of said sleeve portion.

4. A hook as claimed in claim 1, wherein said sleeve portion is composed of two separate parts, each having mutually inter-engageable means to removably secure said parts together to form a complete sleeve portion.

5. A hook as claimed in claim 4, wherein said two sleeve parts comprise a bottom half-cylindrical part integral with said suspending portion and the other sleeve part is a top half-cylindrical part, the bottom half-cylindrical part having longitudinally extending external ribs with dovetailed steps along their bottom face, said top half-part having upwardly facing steps engaging and mating with said dovetailed steps of said bottom half-part, the two parts being mutually engageable by relative axial displacement.

6. A hook as claimed in claim 5, further locking screws removably securing the top sleeve part and said ribs.

* * * * *